April 24, 1934. C. SAI 1,956,048
FRUIT WASHING DEVICE FOR TABLE USE
Filed Oct. 6, 1932
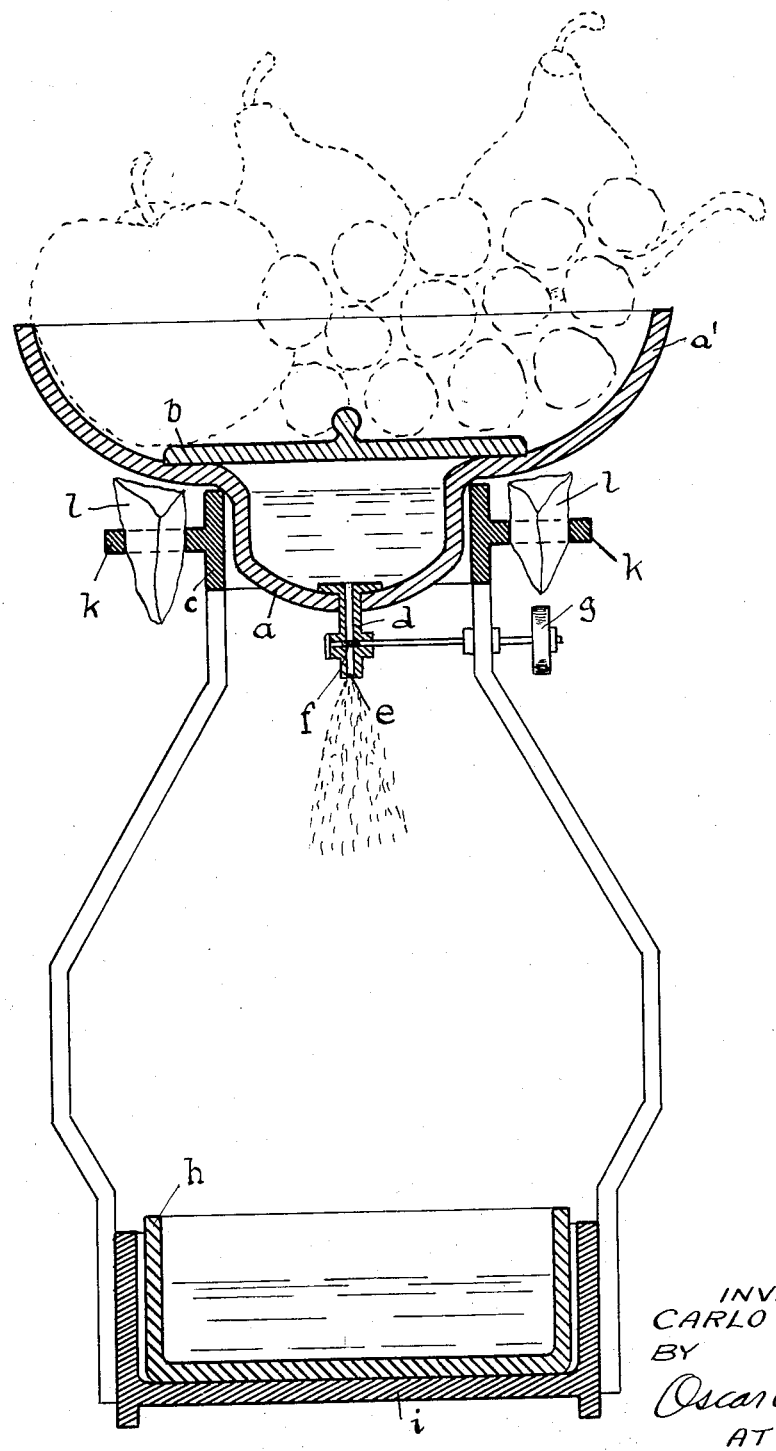
INVENTOR
CARLO SAI
BY
Oscar A. Geie,
ATTORNEY Patented Apr. 24, 1934

1,956,048

UNITED STATES PATENT OFFICE 1,956,048

FRUIT-WASHING DEVICE FOR TABLE USE

Carlo Sai, Trieste, Italy

Application October 6, 1932, Serial No. 636,486
In Italy December 2, 1931

1 Claim. (Cl. 146—200)

This invention relates to fruit-washing devices for table use. Known devices of this kind have the disadvantage that the washing water used must always be poured from a separate glass or the like by hand over the fruit which is arranged in a container disposed over a vessel for collecting the used water. The fruit container itself simply forms a washing hopper with an outlet opening arranged directly above the collecting vessel from which outlet the water flows immediately in its entirety into the collecting vessel. Other washing devices with regulatable water supply are not suitable for table use, as the washing bowl must be taken out and emptied after each washing operation.

These disadvantages are avoided by means of the device according to the present invention which comprises a collecting vessel for the used water carried in a stand on which is arranged, at a short distance above said vessel, a water reservoir having an adjustable outlet opening so that the water used for cleaning is kept in storage, always flows afresh through the opening of the cut-off device in adjustable quantity on to the fruit held under the outlet opening and is caught by the collecting vessel.

In the accompanying drawing, one construction of the fruit-washing device according to the invention is shown in vertical longitudinal section. $a$ indicates a water reservoir intended for the clean water provided with a cover $b$ and resting on the upper edge of a carrier frame $c$, on the bottom $i$ of which is removably supported a collecting vessel $h$. The water reservoir $a$ is continued beyond the seat of the cover $b$ as a bowl or dish $a'$ for receiving the fruit and is provided centrally of its base with an outlet nozzle $d$ having an outlet opening $e$, which can be opened or closed by means of the cock $f$ and a small hand wheel $g$.

Dish-like extensions may also be provided on the frame.

On the frame $c$ are fitted rings $k$, hooks, or the like to take hand towels.

In operation, the water reservoir $a$ having the cock $f$ closed, is filled with clean water, whereupon with one hand the fruit to be cleaned is held under the outlet opening $e$, and with the other hand the cock $f$ is opened by means of the small hand wheel $g$.

This procedure has, in addition, the advantage that the fruit does not come into contact with any material subject to oxidizing or like influences.

Having now particularly described and ascertained the nature of my said invention and in what manner the same is to be performed, I declare that what I claim is:—

A fruit-washing device for table use, comprising a bowl adapted to contain the fruit, the middle portion of the bottom of said bowl having the shape of a reservoir adapted to be filled with water, a cover on top of said reservoir, said cover separating the fruit from the water, a container for used water situated below said reservoir, a vertical frame having an upper portion surrounding and supporting said reservoir and a lower portion carrying said container; an outlet nozzle at the bottom of said reservoir, and a cock within said nozzle for regulating the flow of water from said reservoir to said container.

CARLO SAI.